Oct. 5, 1965 E. P. SUNDHOLM 3,209,955
ROD AND PLUNGER ASSEMBLY FOR HEAVY DUTY GREASE GUN
Filed May 14, 1962 2 Sheets-Sheet 1
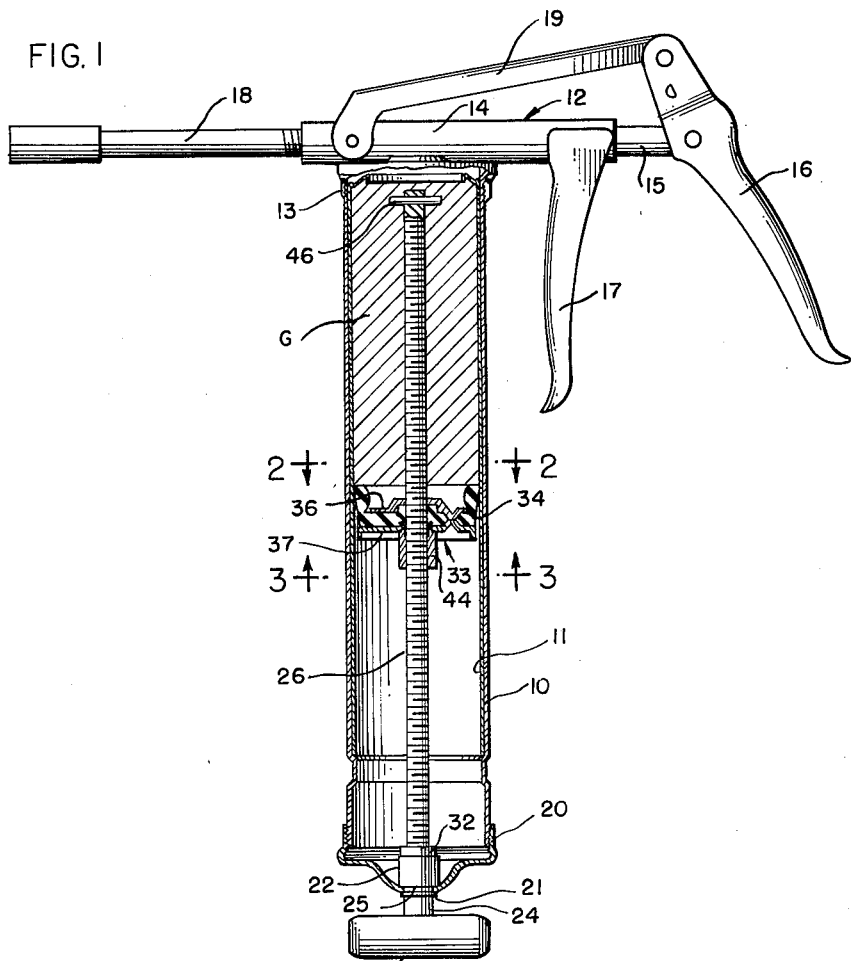
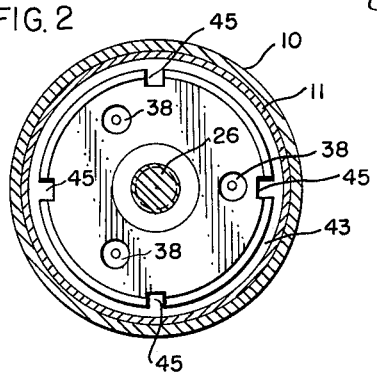
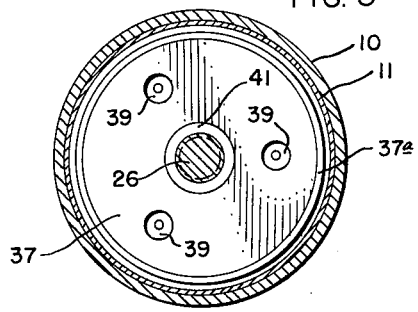
INVENTOR:
EDWIN P. SUNDHOLM
ATT'YS Oct. 5, 1965  E. P. SUNDHOLM  3,209,955
ROD AND PLUNGER ASSEMBLY FOR HEAVY DUTY GREASE GUN
Filed May 14, 1962  2 Sheets-Sheet 2

INVENTOR:
EDWIN P. SUNDHOLM
BY Dawson, Tilton,
Fallon, Lungmus & Alexander
ATT'YS 3,209,955
ROD AND PLUNGER ASSEMBLY FOR HEAVY
DUTY GREASE GUN
Edwin P. Sundholm, Albert City, Iowa, assignor to Southwest Grease & Oil Co., Inc., Wichita, Kans., a corporation of Kansas
Filed May 14, 1962, Ser. No. 195,039
4 Claims. (Cl. 222—256)

This invention relates to a rod and plunger assembly for a heavy duty grease gun. The invention is adapted for use with hand-operated or lever-operated grease guns which employ very heavy or hard greases. The rod and plunger assembly can also be used with air-operated grease guns.

Conventional grease guns are limited as to the types of greases which they can dispense. For example, it has not been possible to dispense very hard or heavy greases with hand-operated grease guns.

In conventional hand-operated grease guns, the grease is fed to the high pressure cylinder of the dispensing head by the suction created in the high pressure cylinder. The suction-feeding may be assisted by the utilization of a spring behind the barrel plunger. The use of suction-feeding or the combination of suction-feeding and spring-feeding depend for effectiveness on having the grease sufficiently soft and flowable so that it will move forwardly in the barrel of the gun within a very short time interval to replace the grease ejected by each stroke of the piston in the high pressure cylinder. As indicated, heavy or hard greases are not sufficiently responsive to permit the satisfactory use of these feeding principles.

It is therefore an object of this invention to provide a hand-operated grease gun utilizing a distinctive feeding principle which adapts the gun for use with very heavy or hard greases. More specifically, it is an object of this invention to provide a rod and plunger assembly of novel construction and design which is capable of accomplishing the stated objectives. Further objects and advantages will be set forth in the following detailed specification.

One embodiment of the present invention is illustrated by the accompanying drawings, wherein—

FIG. 1 is an elevational view, partly in section, showing a grease gun embodying the rod and plunger assembly of the present invention;

FIG. 2 is a transverse sectional view taken on lines 2—2 of FIG. 1;

FIG. 3 is another transverse sectional view taken on lines 3—3 of FIG. 1;

Figure 4:
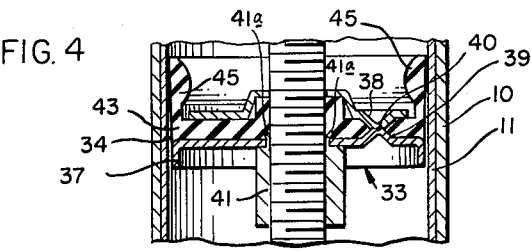
FIG. 4 is an enlarged sectional view showing a portion of the grease gun of FIG. 1.

Looking first at FIG. 1, there is shown a hand-operated grease gun having a tubular barrel 10 for holding a supply of grease. The gun can be used with bulk grease, but it is preferably used with a grease-containing cartridge, such as cartridge 11. The grease within cartridge 11 is indicated by the letter G. For dispensing very hard or heavy greases, the use of cartridge-packaged grease facilitates loading of the gun.

A high pressure dispensing head indicated generally by the number 12 is removably mounted on the front end of barrel 10. In the illustration given, dispensing head 12 includes a threaded cap 13 and a high pressure cylinder 14 which is rigidly secured to the cap. The head also includes a piston assembly 15 for actuating the high pressure cylinder, and an operating handle 16 which is pivotally connected to the outer end of piston assembly 15. By grasping handle 16 and stationary handgrip 17, the operator can move the spring-biased piston assembly 15 inwardly to dispense the grease through outlet pipe 18. In this operation, handle 16 works against link 19 which is pivotally connected at one end to handle 16 and at the other end to high pressure cylinder 14. This dispensing head is described in greater detail in applicant's copending application Serial No. 192,396, filed May 4, 1962, entitled "Piston Assembly for Hand Operated Grease Gun Head." It will be understood, however, that the rod and plunger assembly of the present invention is not limited for use with this specific type of grease gun head, but can be employed with other kinds of hand-operated or lever-operated grease gun heads, such as the grease gun heads described in Sundholm Patents 2,915,226 and 2,978,151. All such constructions, provide a grease intake port which provides communication between the high pressure cylinder and the interior of the barrel. The grease must be transferred from the barrel through this intake port to the high pressure cylinder so that it can be dispensed.

Figure 6:
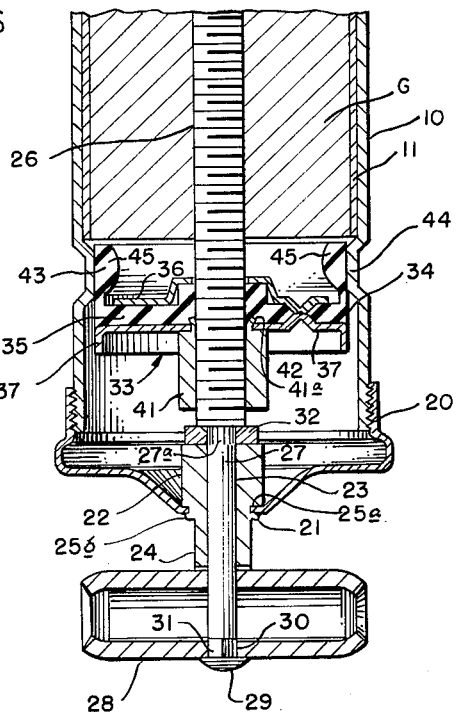

The novel assembly of the present invention includes a cap 20 which extends across the rear end of barrel 10 and is detachably secured thereto. Preferably, cap 20 is threadedly connected to barrel 10 as shown in FIGS. 1 and 6. Rear cap 20 provides a central opening 21 which is aligned with the axis of barrel 10.

The combination also includes a bushing 22 which is carried by cap 20 and provides a bore 23 in alignment with cap opening 21. Preferably, bushing 22 provides a reduced portion 24 which extends outwardly through opening 21, and a shoulder 25a which bears against the inside of cap 20. Bushing 22 can be secured to cap 20 in any suitable manner. In the illustration given, a second shoulder 25b is provided by reduced portion 24 just beyond the outside of cap 20. After assembly, shoulder 25b is struck or formed outwardly so that it overlies the adjacent surface of cap 20, as shown in FIG. 6.

A rod 26 is disposed within barrel 10 and extends along the axis of the barrel for most of its length. The body of rod 21 is provided with threads. In the illustration given, the threads on rod 26 are left-hand triple lead threads. As shown more clearly in FIG. 6, rod 26 provides a rearward extension 27 which is rotatably received in the bore 23 of bushing 22. In the illustration given, extension 27 projects rearwardly beyond cap 20 and beyond bushing 22 to receive handle 28. Handle 28 is secured to extension 27 by means of a formed head 29. The opening at 30 through the rear side of handle 28 has a square shape and is dimensioned to snugly receive the squared portion 31 of extension 27, thereby permitting handle 28 to be used for rotating rod 26.

It will be undestood that with this construction rod extension 27 is secured against axial movement with respect to bushing 24, except for a slight play due to the looseness of the parts. Preferably, a washer 32 is interposed between the inner end of the bushing 22 and the enlarged threaded portion of rod 26, the washer 32 serving as a thrust bearing. In the illustration given, washer 32 is tightly received on a splined or knurled portion 27a of rod extension 27, thereby causing the washer to rotate with the rod.

Mounted on rod 26 and cooperating with the continuous thread thereon is a plunger assembly designated generally by the number 33. As indicated more clearly in FIGS. 4 to 6, plunger assembly 33 is in threaded engagement with rod 26 so that the rotation of the rod by means of handle 28 will cause the plunger assembly 33 to advance or retract, providing the plunger assembly is at least partially restrained from rotational movement while being permitted to move axially.

The plunger assembly includes a cup-shaped piston 34 which is formed of a flexible, resilient material, such as synthetic rubber. It will be understood that piston 34 should be formed of material which is not attacked by the grease being dispensed.

In the illustration given, piston 34 includes a transverse web portion 35 which is sandwiched between metal washers 36 and 37. The retaining washers 36 and 37 provide a plurality of projections 38 and 39, as indicated in FIGS. 2, 3 and 4, which extend through openings in web 35, and are united by spot welding, as indicated at 40 in FIG. 4. Preferably, projections 38 and 39 are made slightly larger than the corresponding openings through web 35 so that they will snugly and sealingly engage the portions of the web about the openings.

Figure 5:
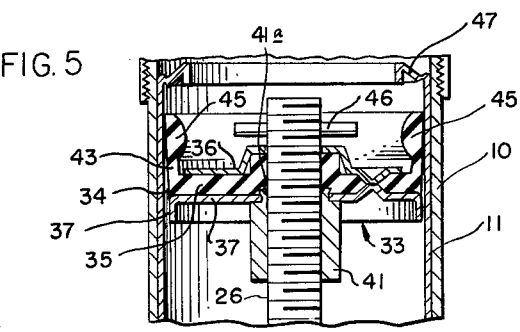
FIG. 5 is a view similar to FIG. 4 showing the plunger assembly in an advanced position; and, FIG. 6 is an enlarged sectional view of the grease gun of FIG. 1 showing the plunger assembly in a retracted position.

In the illustration given, plunger assembly 33 also includes a metal boss 41 which extends rearwardly from washer 37, and is secured thereto. In the illustration given, boss 41 provides a reduced forward end 42 which is inserted in a central opening in washer 37 and extends slightly beyond the forward face of the washer. This permits the forward end 41a of boss 41 to be expanded after assembly for interlocking the parts, as shown in FIG. 6. As indicated in FIGS. 4 to 6, boss 41 is internally threaded for engagement with the threads on rod 26, except adjacent end 41a. Preferably, as shown, the opening through web 35 is also in threaded engagement with rod 26, thereby providing a better seal between rod 26 and web 35.

As shown more clearly in FIGS. 4 and 5, the side walls 43 of piston 34 extend toward the front of the grease gun and flare outwardly. In FIGS. 4 and 5, the forward end of side walls 43 are in engagement with the inside wall of grease cartridge 11. When unconfined, side walls 43 will extend outwardly to a diameter at least slightly greater than the internal diameter of barrel 10, thereby permitting side walls 43 to sealingly engage the inside of barrel 10 when the grease gun is used with bulk-filled greases, and a grease cartridge is not present. Side walls 43 can also be further retracted, as shown in FIG. 6, to facilitate the insertion of piston 34 in the open rear end of the grease cartridge 11. In the illustration given, this is accomplished by retracting piston 34 to a position opposite the inwardly formed annular portion 44 of barrel 10.

In the operation of the device, plunger assembly 33 is retracted to the rear of barrel 10 by rotating handle 28. For example, the plunger assembly may be retracted to the position indicated in FIG. 6. A supply of grease can then be charged to barrel 10 by the removal of head 12. As previously indicated, the barrel may either be filled with bulk grease, or a grease cartridge, such as cartridge 11, can be inserted in the barrel. After the grease has been introduced, the head 12 will be replaced, and handle 28 will be rotated to advance the plunger assembly 33 until piston cup 34 engages the grease and begins to exert pressure thereon. The frictional engagement between the side walls 43 of the piston and the inside of cartridge 11 (or the inner surface of barrel 10) will permit considerable pressure to be exerted on the grease before the piston begins to slip. With this construction, the amount of pressure which can be exerted on the grease cap G is controlled, and the possibility of excessive pressure being exerted is avoided. When the pressure exerted exceeds the frictional resistance of piston 34 to rotation, the entire piston assembly 33 will rotate with rod 26 rather than being advanced further and creating additional pressure.

For use with very heavy or hard greases, it may be desirable to provide an additional means for restraining the rotation of the plunger assembly 33. For example, the forward side of plunger assembly 33 can be provided with projection means for embedding in the grease. In the illustration given, the inside of piston wall 43 provides a plurality of inwardly extending lugs 45 which are arranged to embed themselves in the grease G, thereby tending to restrain the tendency of piston assembly 33 to rotate with rod 26 as pressure is applied to the grease.

The preferred embodiment shown in the drawing also has certain other constructional features which provide advantages. As will be noted, the rear washer 37 of the plunger assembly 33 is provided with an annular lip 37a around its periphery. The lip 37a serves to reinforce the outer edge of washer 37, thereby providing a more rigid backing for piston wall 34.

As shown more clearly in FIG. 5, the forward end of rod 26 is provided with a stop pin 46. Pin 46 acts as a stop means by engaging washer 36 of the plunger assembly, and preventing further forward movement of the plunger assembly. Pin 46 is positioned so that the forward movement of piston 34 will be terminated at a spaced distance from dispensing head 12, thereby preventing the side wall 43 of the piston from approaching the dispensing head too closely. If the piston side wall 43 was forced against the inside of the dispensing head, the piston could be damaged. Where the grease cartridge 11 is provided with a metal cap 47 on the forward end thereof, as shown more clearly in FIG. 5, the piston side wall 43 should also be prevented from being forced against the metal end cap 47, and this can also be accomplished by the stop means 46.

While in the foregoing specification this invention has been described in relation to a preferred embodiment thereof, and many details have been set forth for purpose of illustration, it will be apparent to those skilled in the art that the invention is susceptible to other embodiments, and that many of the details described herein can be varied considerably without departing from the basic principles of the invention.

I claim:

1. In a grease gun having a tubular barrel for receiving a supply of grease in the form of either bulk grease or grease containing cartridges, and including a high pressure dispensing head removably mounted on the front end of said barrel, said barrel provided with an annular constriction adjacent the rear end, a cap extending across the rear end of said barrel and being detachably secured thereto, said cap providing a central opening aligned with the axis of said barrel, a bushing carried by said cap and having a bore in alignment with said cap opening, a rod disposed within said barrel and extending along the axis thereof for most of the length of said barrel, the portion of said rod within said barrel being provided with a continuous thread, said rod providing a rearward extension rotatably received in said bushing, and handle means fixedly secured to the rear end of said rod for manually rotating said rod, said rod being secured against axial movement with respect to said cap, the improvement comprising a plunger assembly received on said rod in threaded engagement therewith, said plunger assembly including a cup-shaped piston of a size to be received within said annular constriction and formed of flexible, resilient material, the side walls of said piston flaring outwardly and extending toward the front of said grease gun to provide a frictional sealing engagement, said plunger assembly being provided on its forward side with projection means for embedding in the grease to restrain the rotation of said plunger assembly as said rod is rotated.

2. In a plunger assembly for a hand-operated grease gun adapted to receive a supply of grease either in the form of bulk grease or grease containing cartridges, and having a cap providing a central opening, a bushing carried by said cap and having a bore in alignment with the opening in said cap, a threaded rod extending forwardly from said cap and providing a rearward extension rotatably received in the bore of said bushing, and handle means fixedly secured to the rear end of said rod, said rod being secured against axial movement with respect to said cap, the improvement comprising a plunger assembly received on said rod in threaded engagement therewith, said plunger assembly including a cup-shaped piston formed of flexible, resilient material for pressing grease forwardly, the side walls of said piston projecting outwardly and forwardly to provide for frictional and sealing engagement over a range of diameters, and said side walls providing a plurality of inwardly extending grease-engaging lugs.

3. In a grease gun of the kind having a tubular barrel with an annular constriction for receiving a supply of grease, and including a high pressure dispensing head removably mounted on the front end of said barrel, a cap extending across the rear end of said barrel and being detachably secured thereto, said cap providing a central opening aligned with the axis of said barrel, a bushing carried by said cap and having a bore in alignment with said cap opening, a rod disposed within said barrel and extending along the axis thereof for most of the length of said barrel, the portion of said rod within said barrel being provided with a continuous thread, said rod providing a rearward extension rotatably received in said bushing, and a handle fixedly secured to the outwardly projecting end of said rod for manually rotating said rod, the improvement comprising a plunger assembly received on said rod in threaded engagement therewith, said plunger assembly including a cup-shaped piston formed of flexible, resilient material, the side walls of said piston flaring outwardly and extending toward the front of said greast gun, said piston of a size to be received within said annular constriction, said side walls providing a plurality of inwardly-extending grease-engaging lugs.

4. In a grease gun of the kind having a tubular barrel for receiving a supply of grease, and including a high pressure dispensing head removably mounted on the front end of said barrel, a cap extending across the rear end of said barrel and being detachably secured thereto, said cap providing a central opening aligned with the axis of said barrel, a bushing carried by said cap and having a bore in alignment with said cap opening, a rod disposed within said barrel and extending along the axis thereof for most of the length of said barrel, the portion of said rod within said barrel being provided with a continuous thread, said rod providing a rearward extension rotatably received in said bushing, and handle means fixedly secured to the rear end of said rod for manually rotating said rod, said rod being secured against axial movement with respect to said cap, the improvement comprising a plunger assembly received on said rod in threaded engagement therewith, said plunger assembly providing a cup-shaped piston formed of flexible, resilient material, the side walls of said piston providing a plurality of inwardly extending grease-engaging lugs, and stop means mounted on the forward end of said rod for engaging said plunger assembly, said stop means being positioned as a spaced distance from said dispensing head to prevent said cup-shaped piston from approaching said dispensing head too closely.

References Cited by the Examiner
UNITED STATES PATENTS

| | | | |
|---|---|---|---|
| 574,688 | 1/97 | Stover | 184—37 |
| 976,945 | 11/10 | Stone | 222—390 |
| 1,506,018 | 8/24 | Lyman | 222—390 |
| 1,637,955 | 8/27 | McLaughlin | 222—390 |
| 1,965,547 | 7/34 | Harris | 222—386 |
| 2,521,569 | 9/50 | Davis | 222—256 |
| 2,915,226 | 12/59 | Sundholm | 222—256 |
| 2,978,151 | 4/61 | Sundholm | 222—386.5 |

LOUIS J. DEMBO, *Primary Examiner.*